United States Patent
Qiao et al.

(10) Patent No.: US 9,453,122 B2
(45) Date of Patent: *Sep. 27, 2016

(54) RUBBER COMPOSITION, PREPARATION METHOD AND VULCANIZED RUBBER THEREOF

(71) Applicants: China Petroleum & Chemical Corporation, Beijing (CN); Beijing Research Institute of Chemical Industry, China Petroleum & Chemical Corporation, Beijing (CN)

(72) Inventors: Jinliang Qiao, Beijing (CN); Yuexin Cong, Shandong (CN); Xiaohong Zhang, Beijing (CN); Ying Li, Shandong (CN); Jianming Gao, Beijing (CN); Qianmin Zhang, Shandong (CN); Zhihai Song, Beijing (CN); Yanling Sun, Shandong (CN); Meifang Guo, Beijing (CN); Peijun Song, Shandong (CN); Chuanlun Cai, Beijing (CN); Guoxun Zhao, Shandong (CN); Hongwei Shi, Beijing (CN); Guicun Qi, Beijing (CN); Jinmei Lai, Beijing (CN); Hongbin Zhang, Beijing (CN); Ya Wang, Beijing (CN); Binghai Li, Beijing (CN); Xiang Wang, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 18 days.

This patent is subject to a terminal disclaimer.

(21) Appl. No.: 14/354,222

(22) PCT Filed: Oct. 26, 2012

(86) PCT No.: PCT/CN2012/083590
§ 371 (c)(1),
(2) Date: Apr. 25, 2014

(87) PCT Pub. No.: WO2013/060290
PCT Pub. Date: May 2, 2013

(65) Prior Publication Data
US 2015/0105490 A1 Apr. 16, 2015

(30) Foreign Application Priority Data

Oct. 26, 2011 (CN) .......................... 2011 1 0330407
Oct. 22, 2012 (CN) .......................... 2012 1 0402962
Oct. 22, 2012 (CN) .......................... 2012 1 0402963

(51) Int. Cl.
| | |
|---|---|
| C08J 3/00 | (2006.01) |
| C08J 3/26 | (2006.01) |
| C08J 3/28 | (2006.01) |
| C08L 9/08 | (2006.01) |
| C08L 23/22 | (2006.01) |
| C08L 9/06 | (2006.01) |
| B60C 1/00 | (2006.01) |

(52) U.S. Cl.
CPC ................ *C08L 9/08* (2013.01); *B60C 1/0016* (2013.04); *C08J 3/005* (2013.01); *C08J 3/26* (2013.01); *C08J 3/28* (2013.01); *C08L 9/06* (2013.01); *C08L 23/22* (2013.01); *C08J 2309/00* (2013.01); *C08J 2309/06* (2013.01); *C08J 2309/08* (2013.01); *C08J 2321/00* (2013.01); *C08J 2409/04* (2013.01); *C08L 2205/02* (2013.01); *C08L 2555/22* (2013.01)

(58) Field of Classification Search
CPC .... C08J 3/28; C08J 2309/00; C08J 2309/06; C08J 2321/00; C08L 23/22; C08L 9/06
See application file for complete search history.

(56) References Cited

U.S. PATENT DOCUMENTS

| | | | |
|---|---|---|---|
| 5,395,891 | A | 3/1995 | Obrecht et al. |
| 6,133,364 | A | 10/2000 | Obrecht et al. |
| 6,184,296 | B1 | 2/2001 | Obrecht et al. |
| 6,207,757 | B1 | 3/2001 | Obrecht et al. |

(Continued)

FOREIGN PATENT DOCUMENTS

| | | |
|---|---|---|
| CN | 101787148 A | 7/2010 |
| CN | 102050972 A | 5/2011 |

(Continued)

OTHER PUBLICATIONS

Machine translation of CN102050973 (Feb. 2015).*
International Search Report from the State Intellectual Property Office of the P.R. China for International Application No. PCT/CN2012/083590 mailed Dec. 27, 2012.

(Continued)

*Primary Examiner* — Irina S Zemel
*Assistant Examiner* — Jeffrey Lenihan
(74) *Attorney, Agent, or Firm* — Finnegan, Henderson, Farabow, Garrett & Dunner, LLP (57) ABSTRACT

A rubber composition, preparation method and vulcanized rubber thereof are provided. The rubber composition comprises uncrosslinked rubber and rubber particles having crosslinked structure dispersed therein, wherein the rubber particles having crosslinked structure are synthetic rubber particles and/or natural rubber particles with an average particle size of 20 to 500 nm and a gel content of 60% by weight or higher, and the uncrosslinked rubber is styrene-butadiene rubber, and wherein the weight ratio of the rubber particles having crosslinked structure to the uncrosslinked rubber is 1:99-20:80.

19 Claims, 1 Drawing Sheet

(56) References Cited

U.S. PATENT DOCUMENTS

| | | |
|---|---|---|
| 6,242,534 B1 | 6/2001 | Obrecht et al. |
| 6,423,760 B1 | 7/2002 | Qiao et al. |
| 6,699,935 B2 | 3/2004 | Akema et al. |
| 6,858,675 B1 | 2/2005 | Taguchi et al. |
| 8,767,359 B2 | 7/2014 | Zhu et al. |
| 2001/0006995 A1* | 7/2001 | Obrecht et al. ............... 525/123 |
| 2002/0161119 A1 | 10/2002 | Obrecht et al. |
| 2003/0105217 A1 | 6/2003 | Zhang et al. |

FOREIGN PATENT DOCUMENTS

| | | |
|---|---|---|
| CN | 102050973 A | 5/2011 |
| EP | 0 405 216 A1 | 1/1991 |
| EP | 0992536 | 4/2000 |
| EP | 1 149 866 A2 | 10/2001 |
| EP | 1 149 867 A2 | 10/2001 |
| EP | 1 314 752 A1 | 5/2003 |
| EP | 1 431 075 A1 | 6/2004 |
| EP | 1 621 571 A1 | 2/2006 |
| EP | 2 676 994 A1 | 12/2013 |

OTHER PUBLICATIONS

European Patent Application No. 12843797.7, by China Petroleum & Chemical Corp. et al.: Extended European Search Report, including Supplementary European Search Report and Search Opinion, dated Aug. 13, 2015 (5 pages).

Mengjiao Wang et al., "Continuous liquid phase mixing process to produce carbon black masterbatch NR," Tire Industry, 24(3):135-143 (2004).

* cited by examiner

RUBBER COMPOSITION, PREPARATION METHOD AND VULCANIZED RUBBER THEREOF

TECHNICAL FIELD

The present invention generally relates to the rubber field, more specifically, to a rubber particle modified rubber composition as well as the preparation method and vulcanized rubber thereof.

BACKGROUND OF THE INVENTION

In modern life, automobile is gradually becoming an indispensable tool. However, the power of automobile derives substantially from the fossil oil which is limited. At the same time, the rapid development of the automobile industry also encounters the pressure of reducing carbon dioxide emission. Therefore, the demand of reducing vehicle fuel consumption has become more and more urgent. By reducing fuel consumption, not only vehicle operating cost but also carbon dioxide emission can be reduced, and the stress of oil resource can be relieved. Besides design factors of automobiles, the rolling resistance of tire is also an important factor influencing the vehicle fuel consumption. The fuel consumption caused by tire rolling resistance comprises 14-17% of total vehicle fuel consumption. It is generally believed that the fuel consumption may be reduced by a factor of 1-2% relative to per 10% reduction in tire rolling resistance. Thus, reducing tire rolling resistance is regarded as one of the most important measures for reducing fuel consumption.

However, thorny problems have been encountered in the research for reducing the rolling resistance of tire rubber material (mainly tread rubber), i.e. the so-called "magic triangle" problem in which rolling resistance, wet skid resistance and wear resistance are mutually restricted. Simply increasing the amount of the softener can improve the wet skid resistance of tire, but wear resistance decreases and rolling resistance increases. Increasing the amount of reinforcing filler (carbon black or silica) can reduce rolling resistance to some extent, but the reinforcing filler is difficult to be uniformly dispersed in rubber which may lead to the deterioration of wet skid resistance. Increasing the amount of vulcanizing agent (i.e. increasing crosslinking density) leads to the same effect as obtained upon increasing the amount of reinforcing filler, i.e. reducing rolling resistance while deteriorating wet skid resistance. In order to achieve the balance of the above three properties, besides the attempt of optimizing the designs of tire structure, extensive studies have been carried out worldwide on the formulation of rubber (mainly tread rubber). On one hand, efforts are focused on synthesizing suitable rubber raw materials such as solution polymerized styrene-butadiene rubber (SSBR), transpolyisoprene (TPI), styrene-isoprene-butadiene rubber (SIBR), high vinyl butadiene rubber (HVBR) etc. On the other hand, efforts have been paid on finding modifiers and practical formulations with better comprehensive performances. Some progresses have been achieved in the formulation research. Representative examples include the combination of solution polymerized styrene-butadiene rubber (SSBR) etc. with carbon black and silica or inversion carbon black system. This system is characterized by substantially fixed main formulation with only variable reinforcing filler, and by simplicity of industrialization. The disadvantages of this system lie in that more silane coupling agents and heavy equipment load are required during the compounding process, and the wear resistance of the vulcanized rubber is not satisfactory.

The rubber gels produced by direct polymerization process or chemical crosslinking process using peroxides may improve the properties of vulcanized rubber if properly formulated. For example, European patent EP405216 and German patent DE4220563 respectively report that the wear resistance and temperature rise by fatigue of the vulcanized rubber were improved by adding neoprene rubber gel or butadiene rubber gel into the rubber composition respectively. However, the wet skid resistance decreases.

Therefore, many patents started to improve the properties of vulcanized rubber by using modified rubber gel. For example, a surface-modified butadiene rubber gel and styrene-butadiene rubber gel were used in U.S. Pat. No. 6,184,296 (the latex particles in the gel has a swelling index of 4-5, and a particle size of 60-450 nm). As a result, the rolling resistance of the vulcanized rubber of natural rubber (NR) formulation system was reduced without any deterioration in strength properties.

In U.S. Pat. No. 6,133,364, chloromethyl styrene was grafted onto the surface of styrene-butadiene rubber gel, and then the modified rubber gel was used in a NR formulation system. As a result, the rolling resistance of the vulcanized rubber was reduced and wet skid resistance is improved.

In U.S. Pat. No. 6,207,757, a chloromethyl styrene modified styrene-butadiene rubber gel was used to achieve the effect of lowering the rolling resistance of the vulcanized rubber in NR formulation system, and meanwhile, improving the wet grip and maintained longevity of tire.

In U.S. Pat. No. 6,242,534, styrene-butadiene rubber gels containing respectively carboxylate and amino group were used together in a NR formulation system. The rolling resistance of the vulcanized rubber system was reduced and the wet skid resistance was enhanced, while the stress at a given elongation was significantly increased.

In European patent EP1431075, a styrene-butadiene rubber gel and a plasticized starch were used to improve the properties of a silica system comprising a combination of styrene-butadiene rubber (SBR) and butadiene rubber (BR). As a result, wear resistance was improved, rolling resistance was reduced, and the specific gravity of the vulcanized rubber was low.

In U.S. Pat. No. 6,699,935, copolymerization modified styrene-butadiene rubber gel was used for conferring low rolling resistance as well as excellent wet skid resistance and wear resistance on the modified styrene-butadiene rubber formulation system.

The rubber gels mentioned in the patent references described above are all crosslinked by chemically crosslinking processes requiring both expensive crosslinking monomers and high energy consumption, and relating mainly to the natural rubber formulation system or silica system of the styrene-butadiene rubber and modified styrene-butadiene rubber formulation system. What is important is that the simultaneous improvements in rolling resistance, wet skid resistance and wear resistance can be obtained only after the crosslinked rubber gel has been modified. Although some of these patents disclose the particle size of the rubber gels, neither of them discloses whether or not a dispersion with initial primary particle size can be realized and whether or not a modification effect via the nano-scale rubber gel can be really achieved when these rubber gels are dispersed into the vulcanized rubber.

DISCLOSURE OF THE INVENTION

Directing to the problems presented in the art, one of the objects of the present invention is providing a rubber composition. The wet skid resistance, rolling resistance and wear resistance of the vulcanized rubber of this rubber composition are improved simultaneously, and the obtained vulcanized rubber can be used as excellent vehicle tire tread rubber.

Another object of the present invention is providing a preparation method of the rubber composition.

Still another object of the present invention is providing a vulcanized rubber of the rubber composition.

International patent application WO 01/40356 submitted by the applicant on Sep. 18, 2000 (Priority dated Dec. 3, 1999) and International patent application WO 01/98395 submitted by the applicant on Jun. 15, 2001 (Priority dated Jun. 15, 2000) disclosed a fully vulcanized powdery rubber. It was disclosed that, after rubber latex is radiation crosslinked, the particle size of latex particles is fixed and no adhesion or coagulation will occur in the subsequent drying process owing to the certain gel content in the latex particles (rubber particles) in the rubber latex resulted from the radiation crosslinking. In the researches, the inventors had found that by mixing such radiation crosslinked rubber latex with an uncrosslinked styrene-butadiene rubber latex and then coagulating them, a rubber composition of styrene-butadiene rubber modified by crosslinked rubber particles will be obtained. Since no adhesion and coagulation will occur among the radiation crosslinked rubber particles having crosslinked structure, while coagulation may occur among the latex particles of common uncrosslinked styrene-butadiene rubber latex, rubber particles having crosslinked structure will be dispersed with their initial particle size in the matrix of the crude rubber obtained after the coagulation of the uncrosslinked styrene-butadiene rubber latex and the uniformity of the dispersion is better than that of the mixture obtained by directly compounding fully vulcanized powdery rubber and crude rubber. The vulcanized rubber is finally prepared by vulcanizing the rubber composition obtained by coagulating two latices described above. Owing to the crosslinked structure of the irradiation crosslinked rubber particles, it is unnecessary to take the vulcanization of dispersed phase into account. Thus, the co-vulcanization problem of the composition composed of different rubbers is solved. At the same time, the irradiation crosslinked rubber particles having crosslinked structure are still uniformly dispersed with very small initial particle size in the vulcanized styrene-butadiene rubber. As a result, the wet skid resistance, rolling resistance and wear resistance of finally obtained vulcanized rubber can be improved simultaneously.

Specifically, the rubber composition of the present invention comprises uncrosslinked rubber and rubber particles having crosslinked structure dispersed therein, wherein the uncrosslinked rubber is a continuous phase and the rubber particles having crosslinked structure are dispersed phase. The rubber particles having crosslinked structure are synthetic rubber particles and/or natural rubber particles, and may be e.g. one or more selected from the group consisting of natural rubber particles, styrene-butadiene rubber particles, carboxylated styrene-butadiene rubber particles, nitrile butadiene rubber particles, carboxylated nitrile butadiene rubber particles, chloroprene rubber particles, polybutadiene rubber particles, silicone rubber particles or acrylic rubber particles, styrene-butadiene-vinylpyridine rubber particles and the like; preferably one or more selected from the group consisting of nitrile butadiene rubber particles, styrene-butadiene-vinylpyridine rubber particles, styrene-butadiene rubber particles, carboxylated styrene-butadiene rubber particles; more preferably one or more selected from the group consisting of styrene-butadiene rubber particles, carboxylated styrene-butadiene rubber particles, nitrile butadiene rubber particles; most preferably nitrile butadiene rubber particles. The said rubber particles have an average particle size of 20 to 500 nm, preferably 50 to 300 nm, more preferably 50 to 200 nm, and a gel content of 60% by weight or higher. The uncrosslinked rubber is styrene-butadiene rubber. The weight ratio of the rubber particles having crosslinked structure to the uncrosslinked rubber is 1:99-20:80, preferably 1:99-10:90, more preferably 2:98-8:92.

The rubber particles having crosslinked structure described above are of homogeneous structure and subjected to neither graft modification nor surface modification. More preferably, the gel content of the rubber particles having crosslinked structure is at least 75 wt %, preferably 80 wt % or higher, and the average particle size of such rubber particles is preferably 50-300 nm, more preferably 50-200 nm.

The preparation process of the rubber composition of the present invention comprises mixing the components containing the uncrosslinked rubber latex and crosslinked rubber latex having the rubber particles with crosslinked structure till homogeneous, and then coagulating them, wherein the latex of the rubber particles having crosslinked structure is a rubber latex obtained after radiation crosslinking.

Concretely, the preparation process of the said rubber composition comprises the following steps:

(1) subjecting a rubber latex to the radiation crosslinking and thereby providing the rubber particles in the latex with a crosslinked structure, the said gel content and meanwhile an average particle size fixed in the said average particle size range;

(2) mixing till homogeneous the above radiation crosslinked rubber latex with a latex of the uncrosslinked styrene-butadiene rubber according to the said weight ratio of the rubber particles having crosslinked structure to the uncrosslinked styrene-butadiene rubber;

(3) coagulating the above mixed latices to obtain the said rubber composition.

In the above described preparation process for the rubber composition, the styrene-butadiene rubber latex is of the synthetic rubber latex commonly known in the art, including those emulsion polymerized styrene-butadiene latex produced by emulsion polymerization process in the art, and the latex obtained by emulsifying styrene-butadiene block rubber obtained according to any process known in the art, preferably styrene-butadiene latex produced directly by the emulsion polymerization process known in the art. The rubber latex prior to the radiation crosslinking may be a natural rubber and/or a synthetic rubber latex produced by synthetic techniques known in the art, for example, may be one or more selected from the group consisting of natural rubber latex, styrene-butadiene rubber latex, carboxylated styrene-butadiene rubber latex, nitrile butadiene rubber latex, carboxylated nitrile butadiene rubber latex, chloroprene rubber latex, polybutadiene rubber latex, silicone rubber latex or acrylic rubber latex, styrene-butadiene-vinylpyridine rubber latex and the like; preferably one or more selected from the group consisting of nitrile butadiene rubber latex, styrene-butadiene-vinylpyridine rubber latex, styrene-butadiene rubber latex, carboxylated styrene-butadiene rubber latex; more preferably one or more selected from the group consisting of styrene-butadiene rubber latex, carboxylated styrene-butadiene rubber latex, nitrile butadiene rubber latex; most preferably nitrile butadiene rubber latex. The weight ratio of the solid content of the rubber latex to the solid content of the styrene-butadiene rubber latex is 1:99 to 20:80, preferably 1:99 to 10:90, more preferably 2:98 to 8:92.

The radiation crosslinking of the rubber latex in the above step (1) is conducted using the same radiation crosslinking process for rubber latex as that for fully vulcanized powdery rubber disclosed in International patent application WO 01/40356 (having the priority dated Dec. 3,1999). The rubber latex obtained after radiation crosslinking is also the same as the rubber latex after radiation but prior to dryness, as disclosed in WO 01/40356.

More specifically, a crosslinking additive may be optionally used in the rubber latex. The crosslinking additive used may be selected from mono-, di-, tri-, tetra- or multifunctional crosslinking additives and any combination thereof. Examples of the monofunctional crosslinking additive include, but are not limited to, octyl (meth)acrylate, isooctyl (meth)acrylate, glycidyl (meth) acrylate. Examples of the difunctional crosslinking additive include, but are not limited to, 1,4-butandiol di(meth)acrylate, 1,6-hexandiol di(meth)acrylate, diethylene glycol di(meth)acrylate, triethylene glycol di(meth)acrylate, neopentyl glycol di(meth) acrylate, divinyl benzene. Examples of the trifunctional crosslinking additive include, but are not limited to, trimethylolpropane tri(meth)acrylate, pentaerythritol tri(meth) acrylate. Examples of the tetrafunctional crosslinking additive include, but are not limited to, pentaerythritol tetra (meth)acrylate, ethoxylated pentaerythritol tetra(meth) acrylate. Examples of the multi-functional crosslinking additive include, but are not limited to, dipentaerythritol penta(meth)acrylate. As used herein, the term "(meth)acrylate" means acrylate or methacrylate. Such crosslinking additive can be used alone or in any combination thereof, as long as it facilitates the radiation crosslinking.

The above crosslinking additive is generally added in the amount of 0.1 to 10% by weight, preferably 0.5 to 9% by weight, more preferably 0.7 to 7% by weight, relative to the dry weight of the rubber in the latex.

The high-energy ray source for the radiation is selected from cobalt source, UV rays or high-energy electron accelerator, preferably cobalt source. The radiation dose may be in the range of 0.1-30 Mrad, preferably from 0.5 to 20 Mrad. Generally, the radiation dose shall be such that the gel content of rubber particles in the rubber latex after the radiation crosslinking is up to 60% by weight or higher, preferably 75% by weight or higher, and more preferably 80% by weight or higher.

Thus, in the rubber composition, which is obtained by mixing such a radiation crosslinked rubber latex with common uncrosslinked styrene-butadiene rubber latex and then coagulating them, the dispersed phase of rubber particles dispersed in the continuous phase of the uncrosslinked crude styrene-butadiene rubber has the same characteristics as the fully vulcanized powdery rubber disclosed in WO 01/40356. That is to say, such rubber particles having crosslinked structure are the rubber particles having a gel content up to 60% by weight or higher, preferably 75% by weight or higher and more preferably 80% by weight or higher. Each particle of such rubber particles having crosslinked structure is homogeneous, that is to say, the individual particle is uniform with respect the composition, and a heterogeneous phenomenon, such as lamellar phase and phase-separation etc. within the particles is not detectable with microscopy available nowadays. Owing to the radiation crosslinking of the corresponding rubber latex, the particle size of the rubber particle having crosslinked structure is fixed consistent with that of latex particles in the initial rubber latex. The rubber particles in the initial rubber latex (latex particles) generally have an average particle size of 20-500 nm, preferably 50-300 nm, more preferably 50-200 nm. Accordingly, the radiation crosslinked rubber particles having crosslinked structure generally have an average particle size of 20-500 nm, preferably 50-300 nm, more preferably 50-200 nm. Owing to the homogeneously mixing of the two latices to be coagulated in this process, the rubber particles in the radiation crosslinked rubber latex have already been crosslinked and thereby possess a certain gel content, which renders the adhesion or coagulation impossible during the coagulation process of the latex. Moreover, such particles can be dispersed uniformly in the uncrosslinked styrene-butadiene rubber. Therefore, in the finally obtained rubber composition, the rubber particles having crosslinked structure as the dispersed phase have an average particle size also in the range of 20-500 nm, preferably 50-300 nm and more preferably 50-200 nm.

The rubber composition of the present invention is produced by mixing the uncrosslinked rubber latex with the radiation crosslinked rubber latex in said weight ratio and coagulating them. During the preparation process, the equipment for mixing these two rubber latices in the mixing step is namely those commonly used mixing equipments in the art and may be selected from mechanical mixing equipments such as high speed mixer or kneader. The conditions and equipments for the coagulation of the latices are those commonly used for latex coagulation in the rubber industry.

The rubber composition of the present invention prepared by mixing the uncrosslinked rubber latex and rubber latex of rubber particles having crosslinked structure and then coagulating them may further comprise filler commonly used in the rubber processing field. The following substances are the fillers especially suitable for preparing the compounded rubber and the vulcanized rubber of the present invention, including: carbon black, silica, metal oxides, silicates, carbonates, sulfates, hydroxides, glass fiber, glass microbead and the like or any mixture thereof. The metal oxide is preferably at least one selected from the group consisting of titanium oxide, alumina, magnesia, calcium oxide, barium oxide, zinc oxide and the like. The rubber composition of the present invention can also contain additives commonly used in the rubber processing and vulcanization, such as crosslinking agents, vulcanization accelerators, antioxidants, heat stabilizers, light stabilizers, ozone stabilizers processing aids, plasticizers, softeners, antiblocking agents, foaming agents, dyes, pigments, waxes, extenders, organic acids, flame retardants, and coupling agents and the like. The above additives are used in their conventional dosages which can be adjusted according to the practical situations.

The above various additives can be added during the mixing of two rubber latices, or after mixing and coagulating two rubber latices by the conventional rubber compounding process. Conventional equipment and process in rubber industry may be used, such as two roller mill, internal mixer, single-screw extruder, double-screw extruder, or the like.

The vulcanized rubber prepared by the rubber composition of the present invention comprises, according to said weight ratio, vulcanized styrene-butadiene rubber matrix and dispersed rubber particles having crosslinked structure with said average particle size.

Specifically, the rubber composition of the present invention as described above is of a microcosmic phase status in which the uncrosslinked styrene-butadiene rubber is the continuous phase while the rubber particles having crosslinked structure is the dispersed phase with the fine particle sizes within the range of from 20 to 500 nm, preferably 50 to 300 nm and more preferably 50 to 200 nm. The vulcanized rubber produced from the rubber composition still possesses the same microstructure.

The vulcanized rubber produced from the rubber composition of the present invention will not be influenced by the vulcanization system, and the vulcanization can be conducted in a conventional sulfur vulcanization system or non-sulfur vulcanization system. The vulcanized rubber produced from the rubber composition of the present invention will not be influenced by the vulcanizing process, and the vulcanization may be plate vulcanization, injection molding vulcanization, vulcanization with vulcanizer, vulcanization by individual vulcanizing machines, salt bath vulcanization, fluid bed vulcanization, microwave vulcanization, high energy radiation vulcanization and the like.

The compounding and vulcanization processes for producing vulcanized rubber from the rubber composition of the present invention can be carried out by conventional processes and equipments in rubber industry, such as two roller mill, internal mixer, single-screw extruder, double-screw extruder, or the like.

The rubber composition of the present invention may be used as solid masterbatch and, together with uncrosslinked block rubber, subject to the compounding process with an internal mixer, a two roller mill or a screw extruder or the like to form a compounded rubber. For example, the rubber latex is firstly crosslinked by using irradiation method to endow rubber particles in the latex with crosslinked structure, and secondly such irradiation crosslinked rubber latex and uncrosslinked rubber latex are mixed in a conventional mixing device and coagulated using conventional coagulation methods for rubber latex to produce a solid masterbatch. Then the solid masterbatch is added into the uncrosslinked block rubber by a conventional compounding method in rubber industry, and they are compounded with addition of conventional rubber processing aids and vulcanized to produce the vulcanized rubber. Such obtained compounded rubber may also ensure a microstructure in which the radiation crosslinked rubber particles having crosslinked structure are dispersed with the defined particle size range in the uncrosslinked rubber matrix.

Owing to fixing the rubber particles in rubber latex with their initial particle size by irradiation crosslinking, the irradiation crosslinked rubber particles will disperse with a fine particle size range of 20-500 nm in the uncrosslinked styrene-butadiene rubber during the coagulation process and the subsequent vulcanizing process for vulcanized rubber preparation. Thereby the said micromorphology is obtained and the rubber particles having crosslinked structure can exert their effect, solving the co-vulcanization problem of different rubbers during vulcanizing process. Therefore the vulcanized rubber prepared by the rubber composition of the present invention can be improved simultaneously in wet skid resistance, rolling resistance and wear resistance.

To sum up, the vulcanized rubber prepared by the rubber composition of the invention possesses not only low rolling resistance and excellent wet skid resistance, but also superior wear resistance, which makes it possible for use as high performance vehicle tread rubber.

The preparation processes for rubber composition of the present invention and its vulcanized rubber can be practiced and operated easily with common process conditions in the art, and can be used in wide applications.

Furthermore, the present invention relates to the following embodiments:

1. A rubber composition, comprising uncrosslinked rubber and rubber particles having crosslinked structure dispersed therein, wherein the rubber particles having crosslinked structure are synthetic rubber particles and/or natural rubber particles with an average particle size of 20-500 nm and a gel content of at least 60 wt % and the uncrosslinked rubber is styrene-butadiene rubber, and wherein the weight ratio of the rubber particles having crosslinked structure to the uncrosslinked rubber is 1:99-20:80.

2. The rubber composition according to the embodiment 1, characterized in that the rubber particles having crosslinked structure are one or more selected from the group consisting of natural rubber particles, styrene-butadiene rubber particles, carboxylated styrene-butadiene rubber particles, nitrile butadiene rubber particles, carboxylated nitrile butadiene rubber particles, chloroprene rubber particles, polybutadiene rubber particles, silicone rubber particles, acrylic rubber particles, styrene-butadiene-vinylpyridine rubber particles and the like; preferably one or more selected from the group consisting of nitrile butadiene rubber particles, styrene-butadiene-vinylpyridine rubber particles, styrene-butadiene rubber particles, carboxylated styrene-butadiene rubber particles; more preferably one or more selected from the group consisting of styrene-butadiene rubber particles, carboxylated styrene-butadiene rubber particles, nitrile butadiene rubber particles; most preferably nitrile butadiene rubber particles.

3. The rubber composition according to the embodiment 1 or 2, characterized in that the rubber particles having crosslinked structure are of homogeneous structure.

4. The rubber composition according to one of the embodiments 1 to 3, characterized in that the gel content of the rubber particles having crosslinked structure is at least 75 wt % and preferably 80 wt % or higher.

5. The rubber composition according to one of the embodiments 1 to 4, characterized in that the average particle size of the rubber particles having crosslinked structure is 50-300 nm, preferably 50-200 nm.

6. The rubber composition according to one of the embodiments 1 to 5, characterized in that the weight ratio of the rubber particles having crosslinked structure to the uncrosslinked rubber is 1:99-10:90.

7. The rubber composition according to one of the embodiments 1 to 6, characterized in that the weight ratio of the rubber particles having crosslinked structure to the uncrosslinked rubber is 2:98-8:92.

8. The rubber composition according to one of the embodiments 1 to 7, characterized in that the composition is obtained by mixing the components comprising uncrosslinked rubber latex and latex of rubber particles having crosslinked structure and then coagulating them, wherein the latex of rubber particles having crosslinked structure is the rubber latex obtained by irradiation crosslinking.

9. A preparation method for the rubber composition according to any one of the embodiments 1-8, comprising the following steps:

(1) subjecting the synthetic rubber latex and/or natural rubber latex to the radiation crosslinking and thereby providing the synthetic rubber particles and/or natural rubber particles in the latex with a crosslinked structure, the said gel content and meanwhile an average particle size fixed in the said average particle size range;

(2) mixing till homogeneous the above radiation crosslinked synthetic rubber latex and/or the natural rubber latex with a latex of the uncrosslinked styrene-butadiene rubber according to the said weight ratio of the rubber particles having crosslinked structure to the uncrosslinked styrene-butadiene rubber;

(3) coagulating the above mixed latices to obtain the said rubber composition.

10. The preparation method according to the embodiment 9, characterized in that the synthetic rubber latex and/or natural rubber latex is/are one or more selected from the group consisting of natural rubber latex, styrene-butadiene rubber latex, carboxylated styrene-butadiene rubber latex, nitrile butadiene rubber latex, carboxylated nitrile butadiene rubber latex, chloroprene rubber latex, polybutadiene rubber latex, silicone rubber latex or acrylic rubber latex, styrene-butadiene-vinylpyridine rubber latex and the like; preferably one or more selected from the group consisting of nitrile butadiene rubber latex, styrene-butadiene-vinylpyridine rubber latex, styrene-butadiene rubber latex, carboxylated styrene-butadiene rubber latex; more preferably one or more selected from the group consisting of styrene-butadiene rubber latex, carboxylated styrene-butadiene rubber latex, nitrile butadiene rubber latex; most preferably nitrile butadiene rubber latex.

11. A vulcanized rubber prepared by the rubber composition according to any one of the embodiments 1-8, which comprises, according to said weight ratio, vulcanized styrene-butadiene rubber matrix and nitrile butadiene rubber particles having crosslinked structure which is dispersed with said average particle size in the vulcanized styrene-butadiene rubber matrix.

EMBODIMENTS FOR CARRYING OUT THE INVENTION

Figure 1:
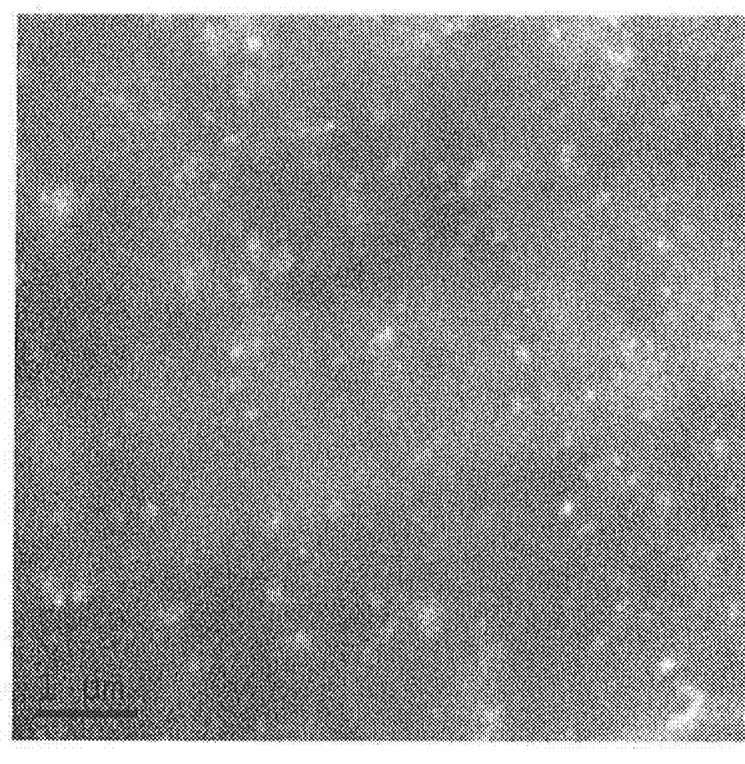
The FIGURE is the microscopic phase transmission electron microscope (TEM) image of the vulcanized rubber of the rubber composition obtained in example 1.

The following examples are provided for further demonstrating the present invention. However, the present invention is in no way limited thereto. The scope of the present invention is defined by the appended claims.

(I) the Experimental Data in the Examples are Determined Using the Following Equipments and Measuring Methods:

(1) Rolling resistance: RSS-□ rubber rolling resistance test machine (from Beijing Rubberinfo Co. Ltd.) is used for determining the rolling power loss.

Under a given load, a wheel-shaped rubber specimen moving at a constant speed is allowed to move relatively to an intimately contacted wheel drum. The surface of the rubber specimen contacting the wheel drum distorts under the effect of the load, and the distortion degree gradually increases from the initial contacting point to the middle point and gradually decreases to zero from the middle point to the leaving point. Due to the different viscoelastic properties of various rubber formulations, the resultant force during the distortion from the initial contacting point to the middle point will be higher than the resultant force during the reversion from the middle point to the leaving point, and this force parallel to the loading force is namely the power loss value of the rubber specimen (J/r) and can be used for characterizing the rolling resistance of the rubber formulation.

Rolling resistance index (%): The rolling resistance value of a pure rubber is determined as a basis. The rolling resistance index is calculated as the percent of the measured values of other modified rubbers relative to the rolling resistance value of the pure rubber.

(2) Determination of wear resistance property: according to GB/T 1689-1998, the abrasion value of a vulcanized rubber is measured using a WML-76 model Akron abrasion tester.

The regulation of such a determination: A specimen is rubbed on a grinding wheel at a certain inclined angle under a certain load, and then the wear volume after certain distance is determined.

The wear volume is calculated as follow $$V = \frac{m_1 - m_2}{\rho}$$

wherein
V—Wear volume of the specimen, $cm^3$
$m_1$—Mass of the specimen before rubbing, g
$m_2$—Mass of the specimen after rubbing, g
$\rho$—Density of the specimen, $cm^3$
The wear index of the specimen is calculated as follows:

$$\text{wear index} = \frac{V_t}{V_s} \times 100\%$$

wherein
$V_s$—Wear volume of rubber with standard formulation.
$V_t$—Wear volume of modified rubber.
Wear index (%): The wear volume value of a pure rubber is determined as a basis. The wear index is calculated as the percent of the measured wear volume value of other modified rubber relative to that of the pure rubber.

(3) Determination of the dynamic mechanical properties (measurement of wet skid resistance): using a DMTA IV (dynamic mechanical thermal analyzer) from US Rheometric Scientific Corporation, with the test conditions of 10 Hz, 0.5% strain and ramp rate 2□ per minute.

The friction of a rubber material on a wet surface is related to the hysteresis loss, and the wet skid resistance is generally characterized by tan δ at 0□. A larger tan δ at 0° C. value indicates a better griping performance of the tyre on wet road.

Wet skid resistance index (%):
The measured wet skid resistance value tan δ of a pure rubber is used as a basis, the wet skid resistance index is calculated as the percent of the measured wet skid resistance values of other modified rubbers relative to that of the pure rubber.

(4) Mechanical property: determined according to the related standard specifications.

(5) Determination of the gel content in the radiation crosslinked rubber latex: The latex, after being radiation crosslinked under certain conditions, is spray dried to produce a fully vulcanized powdery rubber. The gel content of the fully vulcanized powdery rubber is determined by a process disclosed in International patent application WO01/40356 (having a priority dated Dec. 3, 1999), which corresponds to the gel content of the radiation crosslinked rubber latex.

(II) Examples of Employing the Radiation Crosslinked Nitrile Butadiene Rubber Ex and Comparative Examples
Raw Materials:
Emulsion polymerized styrene-butadiene rubber latex SBR1502: a solid content of 20 wt %, styrene unit content of 23 wt %, a mooney viscosity of 50, available from the rubber plant of Qilu Petrochemical Corporation.

Nitrile butadiene rubber latex: Brand: Nitrile-26, available from TIANYUAN Chemical Industrial in Zhaodong.

Carbon black: N234, available from TIANJIN DOLPHIN CARBON BLACK DEVELOPMENT CO. LTD.

Zinc oxide: commercially available.

Stearic acid: commercially available.

Sulfur: LUOZHUANG chemical plant in Linyi.

Accelerator TBBS: N-Tert-butyl-2-Benzothiazole sulfenamide, JINSHAN chemical plant in Zhengzhou.

Calcium chloride: commercially available.

Starch: commercially available.

Glycerol: commercially available.

5% carbolic acid solution: commercially available.

Dicumyl peroxide: commercial available

Process for Latex Coagulation:

A coagulating agent solution was formulated according to the formulation shown in table 1. Then the rubber latex was added to the coagulating agent solution in an amount equivalent to the weight of the coagulating agent solution. After stirring for 15 minutes, a solid rubber (crude rubber) was obtained by filtering, washing and drying.

TABLE 1

| Calcium chloride | Starch | Glycerol | 5 wt % carbolic acid solution | Water |
|---|---|---|---|---|
| 8 parts | 0.8 parts | 0.3 parts | 2 parts | q.s. to 100 parts of total weight of the coagulating agent solution |

Note:
the "parts" in table 1 denotes parts by weight

Preparation of the Compounded Rubber and Vulcanization Process:

Section I:

The operation was conducted in a Banbury mixer (A product of Farrel Bridge Corporation, UK) having a capacity of 1.57 L, rotor speed 80 r·min$^{-1}$. The concrete process comprised respectively adding the styrene-butadiene crude rubber or adding the rubber composition of the present invention, carbon black and other additives (except sulfur and accelerator), laying down the roof bolt and compounding for 3 minutes, and then discharging the rubber (at a temperature of 150-160□).

Section II:

After sulphur, accelerant were added to the compounded rubber as described above in section 1, the material was thinned through a KK-160 two roller mill (produced by Shang Hai Rubber Machinery Factory) for 6 times, then batched out. Then the mixture was vulcanized at 160° C. according to positive sulfuration time $T_{90}$, and thereafter a standard sample strip was made from vulcanized rubber sample. A variety of mechanic properties was tested, and the results were shown in table 3. The compounded rubber formulations were shown in table 2, in which the unit was part by weight.

EXAMPLE 1

1. Preparation of the radiation crosslinked nitrile butadiene rubber latex: A nitrile butadiene rubber latex (Nitrile-26) having a solid content of 45 wt % was added with a crosslinking additive trimethylolpropane triacrylate in an amount of 3 wt % relative to the solid content of the nitrile butadiene rubber latex. Then the mixture was subjected to radiation crosslinking at a radiation dose of 3.0 Mrad to prepare the radiation crosslinked nitrile butadiene rubber latex in which the average particle size of the radiation crosslinked nitrile butadiene rubber particles is 100 nm and the gel content is 91%.

2. The nitrile butadiene rubber latex after the radiation crosslinking was added in a certain solid content ratio into an uncrosslinked emulsion polymerized styrene-butadiene rubber latex SBR1502, wherein the weight ratio of the solid content in the radiation crosslinked nitrile butadiene rubber latex to the solid content in the uncrosslinked emulsion polymerized styrene-butadiene rubber latex was 5:95. After a high speed stirring in a stirrer for 15 minutes the coagulation was conducted according to the latex coagulation process as described above to produce a solid rubber composition. The composition of the coagulating agent solution was the same as shown in table 1.

3. The rubber composition as obtained above was compounded with addition of related additives to produce a compounded rubber, the formulation of which (in parts by weight) was shown in table 2. The preparation process of the compounded rubber and the vulcanization process were the same as those described above. The vulcanized rubber specimen sheet was processed into standard specimen strips for measuring various mechanical properties. The results were shown in table 3.

Furthermore, in order to prevent carbon black, zinc oxide and sulfur in the vulcanization formulation of step 3 from influencing the observation of the dispersion situation of rubber particles having crosslinked structure in microscopic phase transmission electron microscope image of the finally obtained specimen, the rubber composition obtained in step 2 was vulcanized via a peroxide vulcanization system which was formulated by adding into the rubber composition dicumyl peroxide with the amount of 1.5 parts by weight in relation to 100 parts of the rubber composition. The preparation and vulcanization of the compounded rubber were the same as described above. The obtained vulcanized rubber specimen was cut on a freezing microtome into ultrathin slices with a thickness of 0.1 μm, which were stained in the osmium tetroxide vapor for 3 minutes. Thereafter the transmission electron microscopy (TEM) image of micromorphology was photoed, in which the color of stained nitrile butadiene rubber particle was lighter under such staining condition of osmium tetroxide vapor and can be differentiated from the dark continuous phase of styrene-butadiene rubber. As shown in the FIGURE, nitrile butadiene rubber particles were dispersed with an average particle size of 100 nm in the continuous phase of styrene-butadiene rubber.

EXAMPLE 2

Example 1 was repeated except that the weight ratio of solid content of the irradiation crosslinked nitrile butadiene rubber latex to the solid content of the uncrosslinked emulsion polymerized styrene-butadiene rubber latex was 7:93. The specific compounded formulation of the rubber composition was listed in table 2. The performances of vulcanized rubber were shown in table 3.

COMPARATIVE EXAMPLE 1

Example 1 was repeated except that only emulsion polymerized styrene-butadiene latex SBR 1502 was used instead of the mixed two latices. The specific compounded formulation of the rubber composition was listed in table 2. The performances of vulcanized rubber were shown in table 3.

TABLE 2

The formulations of comparative example and examples

| Materials | Comparative example 1 | Example 1 | Example 2 |
|---|---|---|---|
| *SBR1502 | 100 | 95 | 93 |
| Irradiation crosslinked nitrile butadiene rubber | — | 5 | 7 |
| 3# carbon black | 50 | 50 | 50 |
| Zinc oxide | 3 | 3 | 3 |
| Stearic acid | 1 | 1 | 1 |
| Sulfur | 1.75 | 1.75 | 1.75 |
| TBBS | 1 | 1 | 1 |
| Total | 156.75 | 156.75 | 156.75 |

TABLE 3

The main performances of comparative example and examples

| Items | Comparative example 1 | Example 1 | Example 2 | Test standard |
|---|---|---|---|---|
| Hardness (Shore A) | 70 | 71 | 71 | GB/T531.1-2008 |
| 100% stress/MPa | 3.24 | 4.09 | 3.77 | GB/T528-1998 |
| 300% stress/MPa | 18.0 | 23.0 | 20.6 | GB/T528-1998 |
| Tensile strength/MPa | 26.4 | 25.1 | 26.8 | GB/T528-1998 |
| Compression fatigue temperature rise/° C. | 38.25 | 37.45 | 39.45 | GB/T1687-1993 |
| Rebound elasticity/% | 50 | 49 | 49 | GB/T1681-2009 |
| Rolling resistance index/% | 100 | 95.5 | 99.2 | — |
| Wear index/% | 100 | 85.6 | 94.4 | GB/T 1689-1998 |
| Wet skid resistance index/% | 100 | 124 | 124 | — |

As can be seen from the results shown in table 3, the vulcanized rubbers produced from the rubber composition of the present invention were improved simultaneously in rolling resistance index, wear index and wet skid resistance index. The reason was that the radiation crosslinked nitrile butadiene rubber particles having crosslinked structure were uniformly dispersed with the fine particle size of from 50 to 200 nm in the continuous phase of styrene-butadiene rubber matrix. Such characteristics of the rubber composition of the present invention render the rubber composition especially suitable for tread rubber.

(III) Examples of Employing the Radiation Crosslinked Styrene-Butadiene Rubber Latex and Comparative Examples:

Raw Materials:

Emulsion polymerized styrene-butadiene rubber latex SBR1502: a solid content of 20 wt %, styrene unit content of 23 wt %, a mooney viscosity of 50, available from the rubber plant of Qilu Petrochemical Corporation.

Styrene-butadiene rubber latex 1: emulsion polymerized styrene-butadiene latex with the brand of Styrene-butadiene-70, styrene unit content of 70%, available from Yanshi rubber plant in Henan.

Styrene-butadiene rubber latex 2: emulsion polymerized styrene-butadiene latex with the brand of Styrene-butadiene-50, styrene unit content of 50%, available from Qixiang rubber plant in Shandong.

Carbon black: N234, available from TIANJIN DOLPHIN CARBON BLACK DEVELOPMENT CO, LTD.

Zinc oxide: commercially available.

Stearic acid: commercially available.

Sulfur: LUOZHUANG chemical plant in Linyi.

Accelerator TBBS: N-Tert-butyl-2-Benzothiazole sulfenamide, JINSHAN chemical plant in Zhengzhou.

Calcium chloride: commercially available.

Starch: commercially available.

Glycerol: commercially available.

5% carbolic acid solution: commercially available.

Dicumyl peroxide: commercial available

Process for Latex Coagulation:

A coagulating agent solution was formulated according to the formulation shown in table 4. Then the rubber latex was added to the coagulating agent solution in an amount equivalent to the weight of the coagulating agent solution. After stirring for 15 minutes, a solid rubber (crude rubber) was obtained by filtering, washing and drying.

TABLE 4

| Calcium chloride | Starch | Glycerol | 5 wt % carbolic acid solution | Water |
|---|---|---|---|---|
| 8 parts | 0.8 parts | 0.3 parts | 2 parts | q.s. to 100 parts of total weight of the coagulating agent solution |

Note:
the "parts" in table 4 denotes parts by weight

Preparation of the Compounded Rubber and Vulcanization Process:

Section I:

The operation was conducted in a Banbury mixer (A product of Farrel Bridge Corporation, UK) having a capacity of 1.57 L, rotor speed 80 r·min$^{-1}$. The concrete process comprised respectively adding the styrene-butadiene crude rubber or adding the rubber composition of the present invention, carbon black and other additives (except sulfur and accelerator), laying down the roof bolt and compounding for 3 minutes, and then discharging the rubber (at a temperature of 150-160□).

Section II:

After sulphur, accelerant were added to the compounded rubber as described above in section 1, the material was thinned through a XK-160 two roller mill (produced by Shang Hai Rubber Machinery Factory) for 6 times, then batched out. Then the mixture was vulcanized at 160° C. according to positive sulfuration time T$_{90}$, and thereafter a standard sample strip was made from vulcanized rubber sample. A variety of mechanic properties was tested, and the results were shown in table 6. The compounded rubber formulations were shown in table 5, in which the unit was part by weight.

EXAMPLE 3

1. Preparation of the radiation crosslinked styrene-butadiene rubber latex: A styrene-butadiene rubber latex 1 (styrene-butadiene-70) having a solid content of 45 wt % was added with a crosslinking additive trimethylolpropane triacrylate in an amount of 3 wt % relative to the solid content of the styrene-butadiene rubber latex. Then the mixture was subjected to radiation crosslinking at a radiation dose of 3.0 Mrad to prepare the radiation crosslinked styrene-butadiene rubber latex in which the average particle size of the radiation crosslinked styrene-butadiene rubber particles is 150 nm and the gel content is 90%.

2. The styrene-butadiene rubber latex after the radiation crosslinking was added in a certain solid content ratio into an uncrosslinked emulsion polymerized styrene-butadiene rubber latex SBR1502, wherein the weight ratio of the solid content in the radiation crosslinked styrene-butadiene rubber latex to the solid content in the uncrosslinked emulsion polymerized styrene-butadiene rubber latex was 5:95. After a high speed stirring in a stirrer for 15 minutes the coagulation was conducted according to the latex coagulation process as described above to produce a solid rubber composition. The composition of the coagulating agent solution was the same as shown in table 4.

3. The rubber composition as obtained above was compounded with addition of related additives to produce a compounded rubber, the formulation of which (in parts by weight) was shown in table 5. The preparation process of the compounded rubber and the vulcanization process were the same as those described above. The vulcanized rubber specimen sheet was processed into standard specimen strips for measuring various mechanical properties. The results were shown in table 6.

EXAMPLE 4

1. Preparation of the radiation crosslinked styrene-butadiene rubber latex: A styrene-butadiene rubber latex 2 (styrene-butadiene-50) having a solid content of 45 wt % was added with a crosslinking additive trimethylolpropane triacrylate in an amount of 3 wt % relative to the solid content of the styrene-butadiene rubber latex. Then the mixture was subjected to radiation crosslinking at a radiation dose of 3.0 Mrad to prepare the radiation crosslinked styrene-butadiene rubber latex in which the average particle size of the radiation crosslinked styrene-butadiene rubber particles is 100 nm and the gel content is 89%.

2. The styrene-butadiene rubber latex after the radiation crosslinking was added in a certain solid content ratio into an uncrosslinked emulsion polymerized styrene-butadiene rubber latex SBR1502, wherein the weight ratio of the solid content in the radiation crosslinked styrene-butadiene rubber latex to the solid content in the uncrosslinked emulsion polymerized styrene-butadiene rubber latex was 3:97. After a high speed stirring in a stirrer for 15 minutes the coagulation was conducted according to the latex coagulation process as described above to produce a solid rubber composition. The composition of the coagulating agent solution was the same as shown in table 4.

3. The rubber composition as obtained above was compounded with addition of related additives to produce a compounded rubber, the formulation of which (in parts by weight) was shown in table 5. The preparation process of the compounded rubber and the vulcanization process were the same as those described above. The vulcanized rubber specimen sheet was processed into standard specimen strips for measuring various mechanical properties. The results were shown in table 6.

COMPARATIVE EXAMPLE 2

Example 3 was repeated except that only emulsion polymerized styrene-butadiene latex SBR 1502 was used instead of the mixed two latices. The specific compounded formulation of the rubber composition was listed in table 5. The performances of vulcanized rubber were shown in table 6.

TABLE 5

The formulations of comparative example and examples

| Materials | Comparative example 2 | Example 3 | Example 4 |
|---|---|---|---|
| *SBR1502 | 100 | 95 | 97 |
| Irradiation crosslinked styrene-butadiene rubber 1 | — | 5 | — |
| Irradiation crosslinked styrene-butadiene rubber 2 | — | — | 3 |
| 3# carbon black | 50 | 50 | 50 |
| Zinc oxide | 3 | 3 | 3 |
| Stearic acid | 1 | 1 | 1 |
| Sulfur | 1.75 | 1.75 | 1.75 |
| TBBS | 1 | 1 | 1 |
| Total | 156.75 | 156.75 | 156.75 |

TABLE 6

The main performances of comparative example and examples

| Items | Comparative example 2 | Example 3 | Example 4 | Test standard |
|---|---|---|---|---|
| Hardness (Shore A) | 66 | 68 | 67 | GB/T531.1-2008 |
| 300% stress/MPa | 17.7 | 19.7 | 19.5 | GB/T528-1998 |
| Tensile strength/MPa | 27.6 | 26.8 | 21.5 | GB/T528-1998 |
| Compression fatigue temperature rise/° C. | 37.9 | 38.5 | 36.3 | GB/T1687-1998 |
| Rolling resistance index/% | 100 | 99 | 99 | — |
| Wear index/% | 100 | 61.6 | 79.4 | GB/T 1689-1998 |
| Wet skid resistance index/% | 100 | 128 | 104 | — |

As can be seen from the results shown in table 6, the vulcanized rubbers produced from the rubber composition of the present invention were improved simultaneously in rolling resistance index, wear index and wet skid resistance index. The reason was that the radiation crosslinked styrene-butadiene rubber particles having crosslinked structure were uniformly dispersed with the fine particle size of from 50 to 300 nm in the continuous phase of styrene-butadiene rubber matrix. Such characteristics of the rubber composition of the present invention render the rubber composition especially suitable for tread rubber.

(IV) Examples of Employing the Radiation Crosslinked Carboxylated Styrene-Butadiene Rubber Latex and Comparative Examples:

Raw Materials:

Emulsion polymerized styrene-butadiene rubber latex SBR1502: a solid content of 20 wt %, styrene unit content of 23 wt ° A), a mooney viscosity of 50, available from the rubber plant of Qilu Petrochemical Corporation.

Carboxylated styrene-butadiene rubber latex: with the brand of Carboxylated Styrene-butadiene-70, available from Yanshi rubber plant of Yanshan Petrochemical Corporation.

Carbon black: N234, available from TIANJIN DOLPHIN CARBON BLACK DEVELOPMENT CO. LTD.

Zinc oxide: commercially available.
Stearic acid: commercially available.
Sulfur: LUOZHUANG chemical plant in Linyi.
Accelerator TBBS: N-Tert-butyl-2-Benzothiazole sulfenamide, JINSHAN chemical plant in Zhengzhou.
Calcium chloride: commercially available.
Starch: commercially available.
Glycerol: commercially available.
5% carbolic acid solution: commercially available.
Dicumyl peroxide: commercial available Process for Latex Coagulation:

A coagulating agent solution was formulated according to the formulation shown in table 7. Then the rubber latex was added to the coagulating agent solution in an amount equivalent to the weight of the coagulating agent solution. After stirring for 15 minutes, a solid rubber (crude rubber) was obtained by filtering, washing and drying.

TABLE 7

| Calcium chloride | Starch | Glycerol | 5 wt % carbolic acid solution | Water |
|---|---|---|---|---|
| 8 parts | 0.8 parts | 0.3 parts | 2 parts | q.s. to 100 parts of total weight of the coagulating agent solution |

Note:
the "parts" in table 7 denotes parts by weight

Preparation of the Compounded Rubber and Vulcanization Process:

Section I:

The operation was conducted in a Banbury mixer (A product of Farrel Bridge Corporation, UK) having a capacity of 1.57 L, rotor speed 80 r·min$^{-1}$. The concrete process comprised respectively adding the styrene-butadiene crude rubber or adding the rubber composition of the present invention, carbon black and other additives (except sulfur and accelerator), laying down the roof bolt and compounding for 3 minutes, and then discharging the rubber (at a temperature of 150-160□).

Section II:

After sulphur, accelerant were added to the compounded rubber as described above in section 1, the material was thinned through a XK-160 two roller mill (produced by Shang Hai Rubber Machinery Factory) for 6 times, then batched out. Then the mixture was vulcanized at 160° C. according to positive sulfuration time $T_{90}$, and thereafter a standard sample strip was made from vulcanized rubber sample. A variety of mechanic properties was tested, and the results were shown in table 9. The compounded rubber formulations were shown in table 8, in which the unit was part by weight.

EXAMPLE 5

1. Preparation of the radiation crosslinked carboxylated styrene-butadiene rubber latex: A carboxylated styrene-butadiene rubber latex having a solid content of 48 wt % was added with a crosslinking additive trimethylolpropane triacrylate in an amount of 3 wt % relative to the solid content of the carboxylated styrene-butadiene rubber latex. Then the mixture was subjected to radiation crosslinking at a radiation dose of 3.0 Mrad to prepare the radiation crosslinked carboxylated styrene-butadiene rubber latex in which the average particle size of the radiation crosslinked styrene-butadiene rubber particles is 100 nm and the gel content is 93%.

2. The carboxylated styrene-butadiene rubber latex after the radiation crosslinking was added in a certain solid content ratio into an uncrosslinked emulsion polymerized styrene-butadiene rubber latex SBR1502, wherein the weight ratio of the solid content in the radiation crosslinked carboxylated styrene-butadiene rubber latex to the solid content in the uncrosslinked emulsion polymerized styrene-butadiene rubber latex was 3:97. After a high speed stirring in a stirrer for 15 minutes the coagulation was conducted according to the latex coagulation process as described above to produce a solid rubber composition. The composition of the coagulating agent solution was the same as shown in table 7.

3. The rubber composition as obtained above was compounded with addition of related additives to produce a compounded rubber, the formulation of which (in parts by weight) was shown in table 8. The preparation process of the compounded rubber and the vulcanization process were the same as those described above. The vulcanized rubber specimen sheet was processed into standard specimen strips for measuring various mechanical properties. The results were shown in table 9.

COMPARATIVE EXAMPLE 3

Example 5 was repeated except that only emulsion polymerized styrene-butadiene latex SBR 1502 was used instead of the mixed two latices. The specific compounded formulation of the rubber composition was listed in table 8. The performances of vulcanized rubber were shown in table 9.

TABLE 8

The formulations of comparative example and example

| Materials | Comparative example 3 | Example 5 |
|---|---|---|
| *SBR1502 | 100 | 97 |
| Irradiation crosslinked carboxylated styrene-butadiene rubber 1 | — | 3 |
| 3# carbon black | 50 | 50 |
| Zinc oxide | 3 | 3 |
| Stearic acid | 1 | 1 |
| Sulfur | 1.75 | 1.75 |
| TBBS | 1 | 1 |
| Total | 156.75 | 156.75 |

TABLE 9

The main performances of comparative example and example

| Items | Comparative example 3 | Example 5 | Test standard |
|---|---|---|---|
| Hardness (Shore A) | 66 | 69 | GB/T531.1-2008 |
| 300% stress/MPa | 17.7 | 20.6 | GB/T528-1998 |
| Tensile strength/MPa | 27.6 | 24.8 | GB/T528-1998 |
| Compression fatigue temperature rise/° C. | 37.9 | 38.5 | GB/T1687-1993 |
| Rolling resistance index/% | 100 | 99.3 | — |
| Wear index/% | 100 | 83.6 | GB/T 1689-1998 |
| Wet skid resistance index/% | 100 | 102 | — |

As can be seen from the results shown in table 9, the vulcanized rubbers produced from the rubber composition of the present invention were improved simultaneously in rolling resistance index, wear index and wet skid resistance index. The reason was that the radiation crosslinked carboxylated styrene-butadiene rubber particles having crosslinked structure were uniformly dispersed with the fine particle size of from 50 to 300 nm in the continuous phase of styrene-butadiene rubber matrix. Such characteristics of the rubber composition of the present invention are especially suitable for tread rubber.

The invention claimed is:

1. A rubber composition, consisting of uncrosslinked rubber and rubber particles having radiation crosslinked structures, wherein the rubber particles having radiation crosslinked structures comprise synthetic and/or natural rubber particles with a gel content of at least 60 wt %, and wherein the uncrosslinked rubber comprises styrene-butadiene rubber, and further wherein the weight ratio of the rubber particles having radiation crosslinked structures to the uncrosslinked rubber ranges from 1:99 to 20:80, and
wherein the rubber composition comprises a continuous phase comprising the uncrosslinked styrene-butadiene rubber, and a dispersed phase comprising the rubber particles having radiation crosslinked structures, which are dispersed in the continuous phase with fine particle sizes ranging from 20 nm to 500 nm.

2. The rubber composition according to claim 1, wherein the rubber particles having radiation crosslinked structures comprise one or more selected from natural rubber particles, styrene-butadiene rubber particles, carboxylated styrene-butadiene rubber particles, nitrile butadiene rubber particles, carboxylated nitrile butadiene rubber particles, chloroprene rubber particles, polybutadiene rubber particles, silicone rubber particles, acrylic rubber particles, and styrene-butadiene-vinylpyridine rubber particles.

3. The rubber composition according to claim 2, wherein the rubber particles having radiation crosslinked structures comprise one or more selected from nitrile butadiene rubber particles, styrene-butadiene-vinylpyridine rubber particles, styrene-butadiene rubber particles, and carboxylated styrene-butadiene rubber particles.

4. The rubber composition according to claim 3, wherein the rubber particles having radiation crosslinked structures comprise one or more selected from styrene-butadiene rubber particles, carboxylated styrene-butadiene rubber particles, and nitrile butadiene rubber particles.

5. The rubber composition according to claim 4, wherein the rubber particles having radiation crosslinked structures comprise nitrile butadiene rubber particles.

6. The rubber composition according to claim 1, wherein the rubber particles having radiation crosslinked structures are of homogeneous structures.

7. The rubber composition according to claim 1, wherein the gel content of the rubber particles having radiation crosslinked structures is at least 75 wt %.

8. The rubber composition according to claim 7, wherein the gel content of the rubber particles having radiation crosslinked structures is at least 80 wt %.

9. The rubber composition according to claim 1, wherein the average particle size of the rubber particles having radiation crosslinked structures anges from 50 nm to 300 nm.

10. The rubber composition according to claim 9, wherein the average particle size of the rubber particles having radiation crosslinked structures ranges from 50 nm to 200 nm.

11. The rubber composition according to claim 1, wherein the weight ratio of the rubber particles having radiation crosslinked structures to the uncrosslinked rubber ranges from 1:99 to 10:90.

12. The rubber composition according to claim 11, wherein the weight ratio of the rubber particles having radiation crosslinked structures to the uncrosslinked rubber ranges from 2:98 to 8:92.

13. The rubber composition according to claim 1, wherein the composition is obtained by mixing and coagulating uncrosslinked rubber latex and latex of rubber particles having radiation crosslinked structures.

14. A preparation method for the rubber composition according to claim 1, comprising:
(1) subjecting synthetic and/or natural rubber latex to radiation crosslinking, thereby providing radiation crosslinked structures onto the synthetic and/or natural rubber particles in the latex, wherein the synthetic and/or natural rubber particles have said gel content and said average particle size;
(2) mixing until homogeneous the above radiation crosslinked synthetic and/or natural rubber latex with latex of uncrosslinked styrene-butadiene rubber according to said weight ratio of the rubber particles having radiation crosslinked structures to the uncrosslinked rubber; and
(3) coagulating the above mixed latexes to obtain said rubber composition.

15. The preparation method according to claim 14, wherein the synthetic and/or natural rubber latex comprises one or more selected from natural rubber latex, styrene-butadiene rubber latex, carboxylated styrene-butadiene rubber latex, nitrile butadiene rubber latex, carboxylated nitrile butadiene rubber latex, chloroprene rubber latex, polybutadiene rubber latex, silicone rubber latex or acrylic rubber latex, and styrene-butadiene-vinylpyridine rubber latex.

16. The preparation method according to claim 15, wherein the synthetic and/or natural rubber latex comprises one or more selected from nitrile butadiene rubber latex, styrene-butadiene-vinylpyridine rubber latex, styrene-butadiene rubber latex, and carboxylated styrene-butadiene rubber latex.

17. The preparation method according to claim 16, wherein the synthetic and/or natural rubber latex comprises one or more selected from styrene-butadiene rubber latex, carboxylated styrene-butadiene rubber latex, and nitrile butadiene rubber latex.

18. The preparation method according to claim 17, wherein the synthetic and/or natural rubber latex comprises nitrile butadiene rubber latex.

19. A vulcanized rubber prepared by the rubber composition according to claim 1, comprising vulcanized styrene-butadiene rubber matrix and nitrile butadiene rubber particles having radiation crosslinked structures with said average particle size dispersed in the vulcanized styrene-butadiene rubber matrix, wherein the vulcanized styrene-butadiene rubber matrix and the nitrile butadiene rubber particles having radiation crosslinked structures have said weight ratio.

* * * * *

UNITED STATES PATENT AND TRADEMARK OFFICE
CERTIFICATE OF CORRECTION

PATENT NO. : 9,453,122 B2
APPLICATION NO. : 14/354222
DATED : September 27, 2016
INVENTOR(S) : Qiao et al.

It is certified that error appears in the above-identified patent and that said Letters Patent is hereby corrected as shown below:

In the Claims

Claim 9, Column 19, Line 59, "anges from 50 nm" should read --ranges from 50 nm--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*